Figure 1:
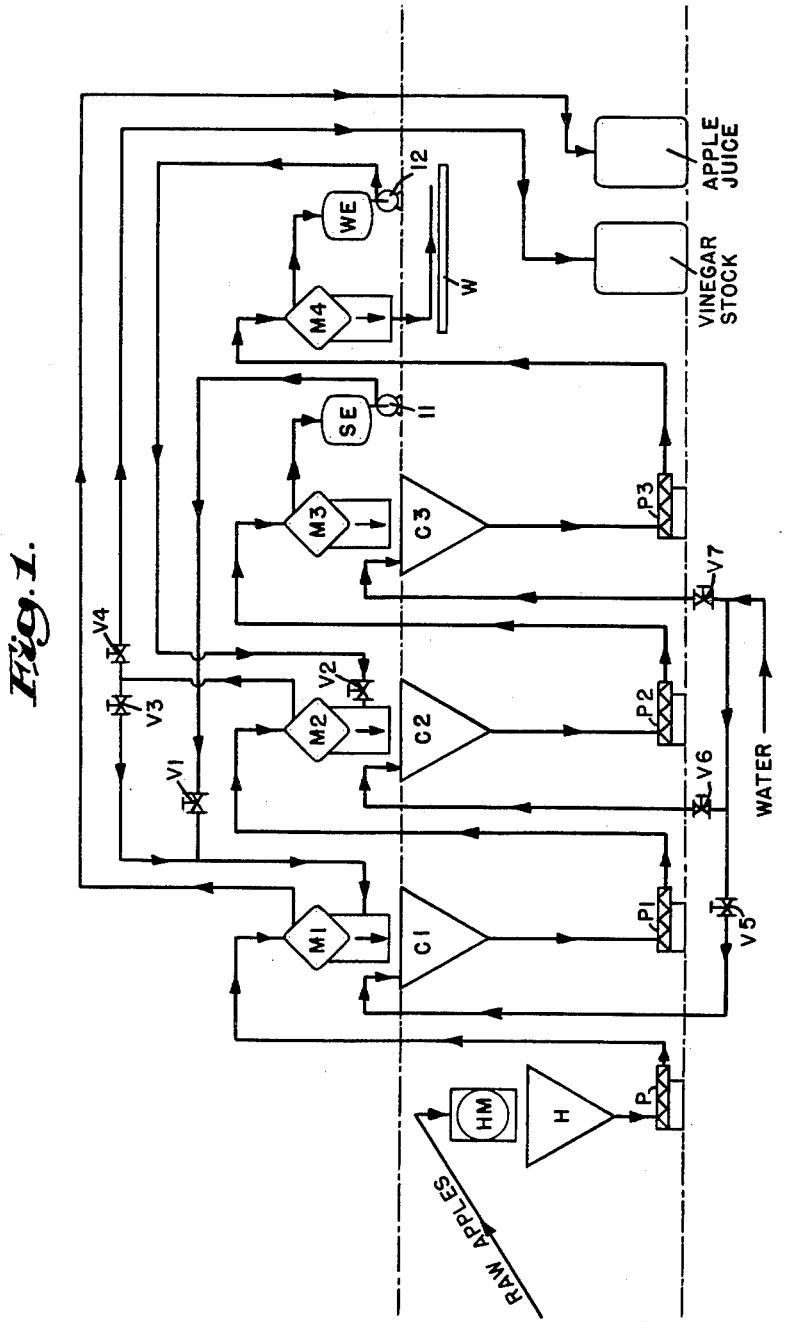

July 3, 1962

J. A. ROWSE 3,042,528

PRODUCTION OF APPLE JUICE AND VINEGAR STOCK

Filed Nov. 27, 1959

3 Sheets-Sheet 3

Inventor:
James A. Rowse,
by Arthur D. Thomson
Attorney

United States Patent Office 3,042,528
Patented July 3, 1962

3,042,528
PRODUCTION OF APPLE JUICE AND VINEGAR STOCK
James A. Rowse, Mason, N.H., assignor to The New England Vinegar Works, Inc., Littleton, Mass., a corporation of Massachusetts
Filed Nov. 27, 1959, Ser. No. 855,768
10 Claims. (Cl. 99—105)

This invention relates to improvements in methods of extracting juices from fruits or vegetables, and pertains more particularly to the commercial production of apple juice and vinegar stock from crushed raw apples.

The principal purpose of the invention is to provide an efficient and effective process for extracting and recovering from meaty fruits, such as apples, juices which are superior in quantity and quality to those which have heretofore been obtained from an equivalent batch of raw fruit; the juices being substantially free of insoluble solids, but retaining a maximum proportion of the soluble solids which preserve the characteristic flavor of the fruit.

More specifically, it is an object of this invention to produce apple juice and vinegar stock by a continuous or semi-continuous, commercially practicable process in which waste pomace and chaff, containing a minimum proportion of soluble solids is continuously or intermittently removed and discarded, thereby ensuring the recovery of nearly all the soluble solids of the raw apples.

The improved process reduces the time and eliminates the labor and unsanitary conditions of the long-used hydraulic apple pressing methods, and obviates the impairment of juice flavor resulting from the employment of unclean press cloths or other filters; and it also avoids the use of excessive quantities of sorghum or other additives heretofore mixed with the crushed fruit to increase the yield of juice.

These, and other advantages of the improved method herein disclosed are attained by feeding crushed apples from a conventional hammer mill to a centrifugal juice extractor, preferably a screening centrifuge of the type manufactured and sold under the name "Mercone"; extracting apple juice for storage and final processing or polishing; discharging the pomace into a hopper to which a relatively strong juice extract (extracted during a subsequent stage of the process) is also supplied, and slurrying the pomace by an agitator; pumping or otherwise feeding the resulting slurry to a similar centrifuge, extracting vinegar stock for storage, discharging the pomace into a similar hopper to which a relatively weak juice extract (also extracted during another subsequent stage of the process) is supplied, and slurrying as aforesaid; next feeding the slurry to a similar centrifuge, extracting a relatively strong juice extract (which is temporarily stored or delivered to the appropriate hopper) discharging the pomace and slurrying with water; and then feeding the slurry to a fourth centrifuging stage where a relatively weak juice extract is produced (and also temporarily stored or delivered to the appropriate hopper), and where the resulting pomace is discharged and discarded.

Figure 2:
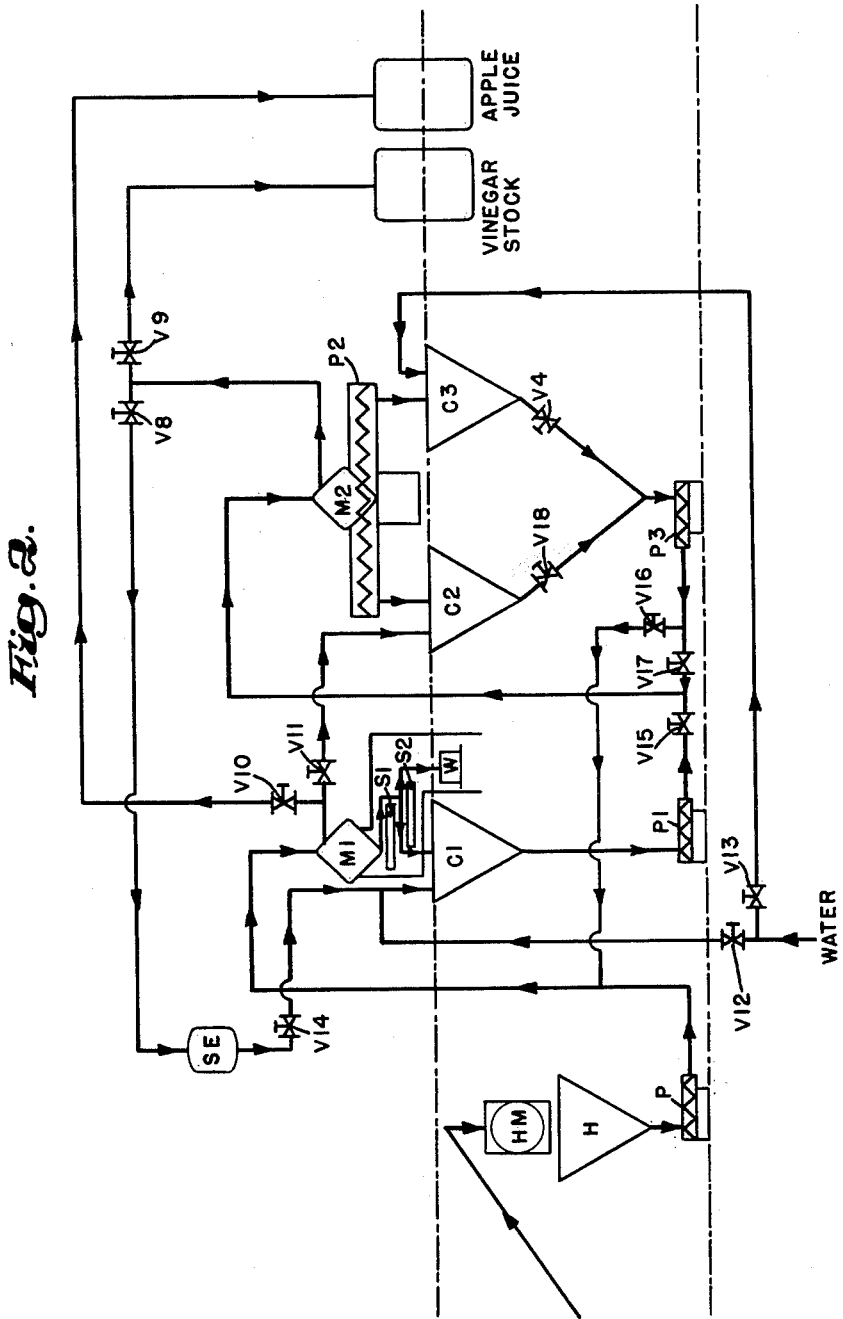
Figure 3:
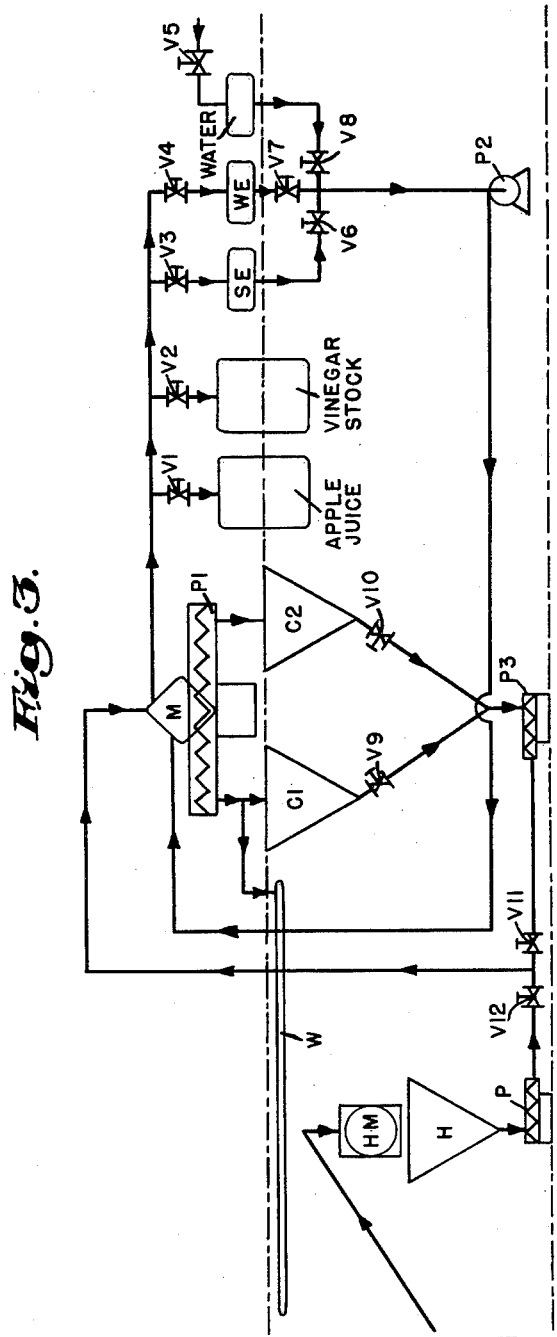

These steps of a production run operation may be performed in a continuous process, utilizing four separate screening centrifuges and three conical hoppers or cones, as schematically illustrated in FIG. 1 of the accompanying drawings; or in a semi-continuous process, with two centrifuges and three hopper cones, as shown in FIG. 2 of the drawing; or in another semi-continuous process, with one centrifuge and two hopper cones, as shown in FIG. 3.

The starting procedure for each of those alternative methods will be explained in the following description of the successive steps or stages of the respective diagrams.

It will be apparent from the drawings and explanation that the steps above described need not necessarily be performed in the precise order stated in all three of the optional variations of this invention; and that the juice extracts or slurrying water may be delivered directly to the appropriate hoppers or to the base of the appropriate centrifuges where it becomes mixed with the pomace before it is discharged into the underlying hopper, the deliveries being pumped from storage tanks (FIGS. 1 and 3), or directly from the centrifuges (FIG. 2).

In each modification of the basic process, the pumps utilized for feeding the slurries to the next centrifuge are preferably worm pumps or screw conveyors of known construction and operation; and reversible conveyors are preferably used to deliver the pomace from a centrifuge to either one of two underlying cones, or to a cone and a waste pomace conveyor, as indicated in FIGS. 2 and 3. It will be understood, however, that the successful practice of the methods herein described and claimed does not require the use of any particular form of apparatus.

In the continuous process diagrammed in FIG. 1, four "Mercones" or other screening centrifuges M1, M2, M3 and M4, having slotted screens with apertures approximately .005" wide, serve as individual juice extracting units. These may be mounted in suitably spaced relation on an upper floor of a bottling or canning plant, as indicated by the broken horizontal line; and three conical hoppers or cones C1, C2, and C3 are suitably located to receive the discharges from the bases of the first three centrifuges, respectively. A waste conveyor W is disposed to receive the discharge from centrifuge M4.

A conventional hammer mill HM receives raw apples and discharges crushed apples into a hopper H from which a predetermined flow of mash is pumped to centrifuge M1 by a worm pump P, as indicated by the solid directional line. Similar pumps P1, P2, and P3 transfer predetermined quantities of slurried pomace from cones C1, C2, and C3 to centrifuges M2, M3 and M4, respectively.

Storage reservoirs for "apple juice" and for "vinegar stock" are provided, as indicated; and storage tanks SE and WE are provided for temporarily holding relatively strong extract and relatively weak extract, respectively. A suitable fluid pump 11 transfers the strong extract in tank SE to the base of centrifuge M1 through a conduit equipped with a control valve V1. A similar pump 12 transfers the weak extract from tank WE to the base of centrifuge M2 through another conduit having a control valve V2.

Juice extracted by centrifuge M1 is delivered through a conduit, by gravity or otherwise, to the "apple juice" reservoir; juice extracted by centrifuge M2 is similarly delivered to the "vinegar stock" reservoir; juice extracted by centrifuge M3 is piped to tank SE; and juice extracted by centrifuge M4 is piped to tank WE. The juice feed line from centrifuge M2 has a branch pipe leading to the base of centrifuge M1. That branch line has a control valve V3; and the main line to the "vinegar stock" reservoir has a control valve V4.

A "water" supply source is connected to pipes leading respectively to the cones C1, C2 and C3, and the respective water supply lines have control valves V5, V6 and V7. Water is supplied to cones C1 and C2 only when the continuous process is started after a shutdown, but water is supplied to cone C3 during the production run.

During the start-up phase and until the extract tanks SE and WE have been filled to normal operating level, as regulated by a ball valve controlling discharge therefrom, or otherwise, water is ratio to cones C1, C2 and C3 in sufficient quantity to slurry the pomace discharged into the cones; apple juice is piped to its reservoir; and the extract from centrifuge M2 is by-passed to the base of centrifuge M1 through the branch pipe controlled by valve V3; V4 being closed. This by-passing of juice extract strengthens the slurry in cone C1.

When the extract delivered to tanks SE and WE reaches operating level, as aforesaid, valves V1 and V2 are opened to deliver extract from the tanks to centrifuges M1 and M2 and the underlying cones C1 and C2; valve V3 is closed and V4 is opened to deliver vinegar stock to its reservoir; and water valves V5 and V6 are closed.

In the meantime, crushed apples have been continuously fed to M1, extracted apple juice has been delivered to its reservoir, pomace from M1 has been slurried in C1 and pumped to M2; and the extracting, slurrying and pumping steps have been repeated at M2 and M3, the waste pomace being discharged from M4 and removed.

The production run then continues as previously explained. Apple juice and vinegar stock are continuously piped to their reservoirs from M1 and M2, respectively; strong extract and weak extract are continuously piped to tanks SE and WE from M3 and M4, respectively; those extracts are recirculated to M1–C1 and M2–C2, respectively, to slurry the pomace at those stations; water is supplied to C3 to slurry the pomace discharged from M3; and waste pomace is carried away from M4. Thus, the pomace from M1 is moved continuously through the successive stages of the operation, becoming weaker and weaker in soluble solid content, while extracted juice is being moved in the opposite direction from tanks SE and WE, and becoming stronger, until it is extracted from M2 and removed to storage as vinegar stock.

The intermittent process shown in FIG. 2 utilizes two screening centrifuges, M1 and M2, with a single cone C1 beneath M1 and two cones, C2 and C3 beneath M2; and M1 has an alternate waste discharge to conveyor W. The hammer mill HM and hopper H for feeding crushed apples to M1 are the same as in FIG. 1, and reservoirs are similarly provided for "apple juice" and "vinegar stock," extracted from M1 and M2, respectively. A tank SE is provided to hold relatively strong extract from M2, on the first run. Thereafter, the tank constitutes a part of the conduit for feeding strong extract from M2 to C1, at a subsequent stage of the intermittent process. The supply pipe for strong extract has a valve V8 in the line to SE, and a valve V9 in an alternate line to the reservoir for vinegar stock.

The extract discharge from M1 also has two branch lines; one to the reservoir for apple juice, controlled by valve V10; and the other, controlled by valve V11, for delivering weak extract to C2.

The "water" supply connects with a pipe to C1, controlled by valve V12, to supply slurrying water to the pomace from M1 on the first run; and with a pipe to C3, controlled by valve V13, to supply slurrying water to C3 at subsequent stages of the process.

On the first, or starting run, valve V14 is closed to retain extract from M2 in the tank SE. The process is started, as in FIG. 1, by feeding crushed apples from hopper H to the centrifuge M1, the charge being in sufficient volume to substantially fill cone C1 with slurry. Cone C1 receives a charge of water to slurry the pomace discharged from M1 and delivered to C1 by screw conveyors S1 and S2, S2 having a reversible worm so that it may, at a subsequent stage, deliver pomace to the waste conveyor W. During the first step or stage, extracted juice is piped to the "apple juice" reservoir; valve V10 being open and valve V11 being closed.

In the second stage, the slurry from C1 is pumped by worm pump P1, through open valve V15 of a conduit, to centrifuge M2; relatively strong extracted juice is piped, by gravity or otherwise, to the temporary storage tank SE; valve V8 being open, and valves V9 and V14 being closed; and pomace is delivered from M2 to cone C3 by a reversible worm pump P2, where it is slurried in water previously or simultaneously supplied to that cone by opening valve V13. The slurry flows to worm pump P3 through open valve V4 of a conduit.

In the third stage, the slurry from C3 is pumped to M1 by P3, valve V16 in the feed line being open, and valve V17 in an alternate conduit to M2 being closed. The relatively weak extract from M1 is piped to cone C2; valve V11 then being open, and valve V10 being closed. The pomace from M1 is discarded by conveyors or pumps S1 and S2, the latter moving to the right of FIG. 2. The waste pomace is removed on conveyor W.

At this point, C2 contains weak extract, valve V18 in the delivery line to P3 being closed; C1 receives strong extract from tank SE by opening valve V14; and emptied cone C3 receives water through opened valve V13. Water supply to C1 has been cut off by closing valve V12.

At the fourth stage, a new charge of crushed apples is fed to M1; the extracted juice is piped to the reservoir for apple juice; the pomace is dumped into C1 (S2 being reversed in direction), for slurrying in the strong extract.

In the fifth stage, the slurry from C1 is pumped to M2 by P1 through open valve V15, valve V17 being closed; the extracted strong juice is piped to the "vinegar stock" reservoir through open valve V9, valve V8 being closed; and pomace from M2 is discharged by pump P2 into the weak extract in C2 where it is slurried.

At the sixth stage, the slurry from C2 is pumped back to M2 by P3, valves V18 and V17 being open and V16 being closed; the strong extract is piped to C1 through open valves V8 and V14 and through tank SE, valve V9 being closed; and pomace is discharged into the water in C3, pump P2 being reversed in operation.

At the same time, or subsequently, a new charge of crushed apples is fed to M1; apple juice is extracted and piped to the reservoir; and pomace is discharged into the strong extract in C1 where it is slurried. This step is the same as the fourth stage described above.

In the seventh stage, the slurry in C3 is pumped to M1; extracted weak extract is piped to C2; the pomace is discarded; and water is pumped into empty cone C3. This step corresponds to the third stage described above.

At the same time, or subsequently, the slurry previously formed in C1 is pumped to M2, vingegar stock is extracted, and pomace is discharged into C2, as described in explaining the fifth stage.

The process is now operating as a production run, and may be continued as an intermittent operation by repeating the sixth and seventh stages, each of which involves two steps which may be performed simultaneously or in the desired order. Thus, the four step production operation described in connection with FIG. 2 is similar to the four step production operation described in connection with the continuous process of FIG. 1.

In the further modification diagrammed in FIG. 3, the four steps are intermittently performed with a single screening centrifuge M which alternately discharges pomace into two conical hoppers or cones C1 and C2 through a reversible worm pump P1, similar to the arrangement of the second centrifuge and cones of FIG. 2. The hammer mill HM and its hopper H and feed pump P are the same as in FIGS. 1 and 2. There are also reservoirs for "apple juice" and "vinegar stock," but in FIG. 3 both reservoirs are supplied by a single pipe line from centrifuge M, under control of valves V1 and V2. The pipe line also leads to a tank SE for strong extract through valve V3 and a tank WE for weak extract through valve V4. A third tank, for "water" storage is fed by a supply pipe through valve V5. Those three tanks discharge to a fluid pump P2 through outlet control valves V6, V7, and V8, respectively; said pump feeding to the bottom portion of centrifuge M.

Cones C1 and C2 have outlet lines controlled by valves V9 and V10, respectively, leading to a worm pump P3 which pumps slurry to centrifuge M through control valve V11. The feed line from the crushed apples pump may also be controlled by valve V12. By an arrangement similar to that under M1 of FIG. 2, pomace discharged from centrifuge M may be deposited from pump P1 either into cone C1 or onto a conveyor W for removing waste. By reversing pump P1, pomace is discharged into cone C2, as aforesaid.

The initial or start-up run of the process indicated in FIG. 3 comprises three steps:

First, a charge of crushed apples is fed into centrifuge M, valve V12 being open; the extracted juice is piped to the "apple juice" reservoir, valve V1 being open and V2, V3, V4, being closed; a predetermined volume of water is pumped from the "water" tank to the lower portion of the centrifuge by pump P2, valve V8 being opened; and pomace and water are discharged into cone C1 and slurried by agitation, as aforesaid.

Next, after opening valve V9, the slurry from C1 is pumped to the centrifuge; the extracted juice is piped to the temporary storage tank SE for strong extract, valves V1 and V2 being closed, V3 being open and V4 being closed; another quantity of water having been pumped to the bottom of the centrifuge, the pomace and water is discharged into cone C2 and slurried.

Finally, the slurry in cone C2 is pumped to the centrifuge, valve V10 being open; the extracted juice is piped to the weak extract tank WE; and the pomace is discharged onto belt W.

At this point, the tanks for strong extract, SE, and weak extract WE, are filled. The "water" tank has also been filled; and the system is ready for the four steps of the production run.

In the first stage, crushed apples are fed to the centrifuge; the extracted juice is piped to the "apple juice" reservoir; strong extract is pumped to the centrifuge from tank SE; and the diluted pomace is slurried in C1 for subsequent use.

In the second stage, the slurry from C1 is pumped to the centrifuge M; the extracted juice is piped to the reservoir for "vinegar stock;" weak extract from tank WE is pumped to the lower portion of the centrifue M; and the diluted pomace is discharged into cone C2 and slurried.

In the third stage, the slurry from C2 is pumped to the centrifuge M; the extracted juice is piped to empty tank SE for strong extract; water is added from the "water tank" to the pomace in M; and the diluted pomace is slurried in cone C1.

In the fourth stage, the slurry in cone C1 is pumped to centrifuge M; the extracted juice is piped to empty tank WE for weak extract for subsequent use; and the pomace is discarded.

These steps are repeated during the production run. For the final run, the first and second stages of the production run are repeated, but in the third stage, the extracted juice is collected as "vinegar stock," and the pomace is discarded, leaving tanks SE and WE empty.

During the production run of the continuous process of FIG. 1, crushed apples may be fed to the first centrifuge at a rate of approximately 75 gallons per minute; juice for both apple juice and vinegar stock is extracted at a rate of about 50 gallons per minute; and waste pomace is discharged at a rate of 25 gallons per minute. The liquid content of the system stays approximately uniform, for the extract collected in supply tanks SE and WE, plus the water added to cone C3, should be approximately equivalent to the quantity of apple juice and vinegar stock produced for storage at each extraction of a charge of crushed apples. The process recovers 85% or more of the juice and soluble solids of the raw apples.

Although, as aforesaid, additives are not necessary to produce the yield achieved by the practice of this invention, a very small proportion of an additive such as "Solka Flok BW 20" (e.g. ¼% to 1% on the weight of the raw apples) may be introduced into the hammer mill to help reduce the fine solids which otherwise would pass the fine screens of the centrifuges.

It will be understood that the apple juice produced by the improved process is, in accordance with common practice, filtered and polished to further reduce or eliminate the insoluble solid content of the juice, so that the juice may be bottled or canned for consumption as a beverage; and that the apple juice or vinegar stock may be condensed by vacuum evaporation to increase its content of soluble solids for subsequent conversion to cider vinegar, or to provide a jelly concentrate.

It will also be understood that the worm pumps or screw conveyors herein illustrated and described as preferred types of apparatus for pumping or transferring crushed apples, crushed apple pulp or slurry, from one part of the system to another part thereof, are disclosed merely as appropriate devices for that purpose, and that any suitable forms of pumps or conveyors may be used in practicing the process. For example, the reversible screw pumps or conveyors P2 of FIG. 2, P1 of FIG. 3, and S1 and S2, may be substituted by conveyor belts or other devices; and any of the other worm pumps may be gear pumps or the equivalent.

It will be apparent, moreover, that wherever the drawings show that water or juice is fed to the base of a centrifuge or, alternatively to the underlying cone, as a slurrying liquid, the alternate manner of delivery may be employed in each instance; for the point of delivery is unimportant. When the liquid is fed to the base of the centrifuge, it becomes mixed with the pomace by the continuing operation of the centrifuge; but when it is fed directly to the underlying cone, it is necessary to agitate the pomace and liquid in the cone to form a slurry suitable for transfer to the next centrifuging operation.

Finally, it will be remembered that the process herein disclosed may be used, as aforesaid, in extracting the juices of many vegetables as well as fruits other than apples. When other fruits, or vegetables are so processed the extracted beverage juice (herein described as apple juice) is the primary product of the process, and the extracted by-product (herein described as vinegar stock) may be used or further processed for such purpose as may be appropriate. Hence, the terms "apple juice" and "vinegar stock," as set forth in the following claims are intended to include the primary and secondary extractions of the juices of other fruits and vegetables which may be satisfactorily treated by the method of this invention.

I claim:

1. A process of producing apple juice and vinegar stock which consists in screen centrifuging crushed apples to extract apple juice for storage and to discharge pomace; slurrying the pomace in the presence of a relatively strong apple juice extract, and screen centrifuging the resulting slurry to extract vinegar stock for storage and to discharge a second pomace; slurrying the second pomace in the presence of a relatively weak apple juice extract, and screen centrifuging the resulting slurry to extract a relatively strong extract for temporary storage and to discharge a third pomace; slurrying the third pomace in the presence of water, and screen centrifuging the resulting slurry to extract a relatively weak extract for temporary storage and to discharge a fourth pomace for discarding.

2. A process according to claim 1 in which the strong extract and weak extract temporarily stored in the third and fourth stages of the process, respectively, are used in slurrying the pomace derived from the first and second stages, respectively, during a production run.

3. A process according to claim 2, in which sources of supply of the strong and weak extracts are initially provided by slurrying a preliminary pomace in the presence of water, centrifuging the resulting slurry to extract a relatively strong extract for temporary storage and to discharge a second preliminary pomace; slurrying the second preliminary pomace in the presence of water, and centrifuging the resulting slurry to extract a relatively weak extract for temporary storage.

4. A process according to claim 3, in which the successive stages of the production run are performed as a continuous operation, each centrifuging step consisting in centrifugally forcing the slurry against a screen, so that juice passes through the screen and pomace is retained within the screen and discharge downwardly therefrom.

5. A process according to claim 4, in which the pomace of each extraction is agitated to form a slurry.

6. A process of producing apple juice and vinegar stock which consists in providing sources of supply of relatively strong apple juice extract, relatively weak apple juice extract and water; feeding crushed apples to a screening centrifuge, extracting apple juice in the centrifuge and storing the juice, adding a predetermined quantity of the strong juice extract to the pomace of the centrifuge, and agitating to form a first slurry; feeding the first slurry to a screening centrifuge, extracting juice in the centrifuge, and storing the same as vinegar stock, adding a predetermined quantity of the weak juice extract to the pomace of the centrifuge and agitating to form a second slurry; feeding the second slurry to a screening centrifuge, extracting juice in the centrifuge and transferring that juice to the source of supply of strong extract, adding a predetermined quantity of water to the pomace of the centrifuge, and agitating to form a third slurry; feeding the third slurry to a screening centrifuge, extracting juice in the centrifuge and transferring that juice to the source of supply of weak extract, and discarding the pomace of the centrifuge.

7. A process as described in claim 6, in which the sources of supply of the strong extract and weak extract are initially provided by agitating the pomace of a centrifuge extraction in the presence of water to form a preliminary slurry, extracting juice from that slurry, and temporarily storing that juice as strong extract; then agitating the pomace of the last named extraction in the presence of water to form a second preliminary slurry, extracting juice from the second preliminary slurry, and temporarily storing that juice as weak extract.

8. A process of producing a beverage juice from fruit and vegetable products, which consists in passing the crushed products through a screening centrifuge to extract beverage juice for storage, and to discharge pomace; slurrying the pomace in the presence of a relatively strong juice extract produced by the process; passing the resulting slurry through a screening centrifuge to extract a secondary juice extract for storage, and to discharge a second pomace; slurrying the second pomace in the presence of a relatively weak juice extract produced by the process; passing the resulting second slurry through a screening centrifuge to extract the said relatively strong juice, and to discharge a third pomace; slurrying the third pomace in the presence of water; and passing the resulting third slurry through a screening centrifuge to extract the said relatively weak juice, and to discharge a fourth pomace for discarding.

9. A process according to claim 8, in which the said relatively strong and weak juice extracts are temporarily stored after the extraction thereof, and subsequently used in slurrying the first and second pomaces, respectively.

10. A process according to claim 9, in which each slurrying operation involves agitation to intermix the pomace and the slurrying liquid.

References Cited in the file of this patent
UNITED STATES PATENTS

| | | |
|---|---|---|
| 2,312,829 | Bird et al. | Mar. 2, 1943 |
| 2,647,058 | Schapiro | July 28, 1953 |
| 2,752,043 | Van Riel | June 26, 1956 |
| 2,823,126 | Little | Feb. 11, 1958 |